United States Patent
Béguin et al.

(10) Patent No.: US 9,297,689 B2
(45) Date of Patent: Mar. 29, 2016

(54) DEVICE AND METHOD FOR THE ADJUSTMENT OF AN ECCENTRIC LOAD ERROR IN A PARALLEL-GUIDING MECHANISM

(71) Applicant: Mettler-Toledo AG, Greifensee (CH)

(72) Inventors: Christophe Béguin, Wetzikon (CH); Thomas Köppel, Oetwil am See (CH); Hans-Rudolf Burkhard, Wila (CH)

(73) Assignee: Mettler-Toledo GmbH, Greifensee (CH)

( * ) Notice: Subject to any disclaimer, the term of this patent is extended or adjusted under 35 U.S.C. 154(b) by 207 days.

(21) Appl. No.: 13/738,586

(22) Filed: Jan. 10, 2013

(65) Prior Publication Data
US 2013/0175098 A1    Jul. 11, 2013

(30) Foreign Application Priority Data
Jan. 11, 2012   (EP) .................................. 12150759

(51) Int. Cl.
*G01G 21/24*    (2006.01)
*G01G 3/14*     (2006.01)
*G01G 23/01*    (2006.01)

(52) U.S. Cl.
CPC .............. *G01G 21/24* (2013.01); *G01G 3/1412* (2013.01); *G01G 21/244* (2013.01); *G01G 23/01* (2013.01)

(58) Field of Classification Search
CPC ....... G01G 3/14; G01G 21/24; G01G 21/244; G01G 23/01; G01G 3/1412
USPC ................................ 177/1, 210 EM, 212, 229
See application file for complete search history.

(56) References Cited

U.S. PATENT DOCUMENTS

| | | | | |
|---|---|---|---|---|
| 4,485,881 A | * | 12/1984 | Tramposch et al. | 177/211 |
| 4,813,505 A | * | 3/1989 | Sodler et al. | 177/212 |
| 5,082,073 A | * | 1/1992 | Stadler et al. | 177/212 |
| 5,090,494 A | * | 2/1992 | Muller et al. | 177/229 |
| 6,232,567 B1 | | 5/2001 | Bonino et al. | |
| 7,612,304 B2 | * | 11/2009 | Kobayashi et al. | 177/229 |

(Continued)

FOREIGN PATENT DOCUMENTS

| | | | | |
|---|---|---|---|---|
| DE | 20217590 | * | 1/2003 | ............ G01G 21/24 |
| DE | 20217590 U1 | | 1/2003 | |

(Continued)

OTHER PUBLICATIONS

Human translation of DE20217590 obtained Oct. 2014.*

*Primary Examiner* — Peter Macchiarolo
*Assistant Examiner* — Natalie Huls
(74) *Attorney, Agent, or Firm* — Standley Law Group LLP (57) ABSTRACT

A parallel-guiding mechanism (120) has a movable parallel leg (121), a stationary parallel leg (122), a first parallel-guiding member (123) and a second parallel-guiding member (124). The parallel legs and the parallel-guiding members are connected to each other by flexure pivots, in the form of narrow material connections. There is at least one adjustment zone (135). An adjustment flexure fulcrum (136) is arranged between a flexure pivot (131) and a parallel leg. The adjustment zone is connected to the first lever end (138) of an adjustment lever (137). The adjustment flexure fulcrum forms the lever fulcrum (146) of the adjustment lever, which has an elastic domain with a section modulus that is smaller than a section modulus of the adjustment flexure fulcrum.

14 Claims, 6 Drawing Sheets

(56) References Cited

U.S. PATENT DOCUMENTS

| | | | |
|---|---|---|---|
| 7,851,713 B2* | 12/2010 | Burkhard et al. | 177/210 EM |
| 8,153,913 B2* | 4/2012 | Haefeli et al. | 177/229 |
| 2010/0044118 A1* | 2/2010 | Burkhard et al. | 177/210 EM |

FOREIGN PATENT DOCUMENTS

| | | |
|---|---|---|
| JP | 2002-365125 A | 12/2002 |
| WO | 2005/031286 A1 | 4/2005 |

\* cited by examiner

Figure 3C

DEVICE AND METHOD FOR THE ADJUSTMENT OF AN ECCENTRIC LOAD ERROR IN A PARALLEL-GUIDING MECHANISM

CROSS-REFERENCE TO RELATED APPLICATIONS

This application is entitled to benefit of a right of priority under 35 USC §119 from European patent application 12150759.4, filed 11 Jan. 2012, the content of which is incorporated by reference as if fully recited herein.

TECHNICAL FIELD

The disclosed embodiments relate to a parallel-guiding mechanism whose movable parallel leg is constrained in guided motion relative to a stationary parallel leg by a first and a second parallel-guiding member. The parallel legs and the parallel-guiding members are connected to each other by flexure pivots in the form of narrow material connections. Furthermore, at least one adjustment zone with an adjustment flexure fulcrum is arranged between a flexure pivot and a parallel leg, wherein the adjustment zone is connected to the first lever end of an adjustment lever and wherein the adjustment flexure fulcrum forms the fulcrum of the adjustment lever. A weighing pan supported by the movable parallel leg holds the load to be weighed. The force which is thereby exerted on the weighing pan is transmitted, either directly or through a force-reduction lever, to a measurement transducer. The parallel-guiding mechanism, the force-transmitting system and the measurement transducer together constitute in essence the weighing cell of a gravimetric measuring instrument. The known state of the art includes weighing cells with different operating principles, such as for example strain-gauge load cells, weighing cells with oscillating strings, or weighing cells based on electromagnetic force compensation (EMFC).

BACKGROUND

In EMFC weighing cells the weight of the load is transmitted either directly or by way of one or more force-transmitting levers to an electromechanical measurement transducer which generates an electrical signal corresponding to the weight of the load, which is processed and sent to a display by an electronic weighing signal processor.

Weighing cells with a measurement transducer based on elastic deformation contain a deformable body to which strain gauges are attached. The deformable body changes its shape elastically under the applied load. In many cases, the deformable body is configured as a parallelogram transducer, i.e. a parallel-motion linkage with specially configured bending zones whereby defined zones of deformation, specifically bending zones, are set up where the strain gauges are arranged. As the strain gauges are stretched or compressed as a result of the deformation, they exhibit a change in their respective electrical resistance values in comparison to the stress-free state, and the resistance change represents a measure for the applied load.

In weighing cells with oscillating strings, the mechanical design concept is largely analogous to the EMFC weighing cells, with the difference that an oscillating-string measurement transducer is used instead of an electromagnetic transducer. By applying the weighing load, an oscillating string is put under tension and the resultant change of its resonance frequency represents again a measure for the applied load.

One characteristic trait of the weighing cells of the foregoing description, which all balances with a parallel-guided weighing pan (as opposed to a freely suspended weighing pan) have in common, is the property that the weight force transmitted from the weighing pan to the transducer generally shows a slight dependency on whether the weighing load is placed on the center of the weighing pan or off-centered towards the edge. This can have the undesirable consequence that a balance indicates a different amount of weight for one and the same weighing load, depending on where the load was placed on the weighing pan. These deviations which occur when the weighing load is placed eccentrically on the weighing pan are commonly called eccentric load errors.

In a parallelogram transducer or in a parallel-guiding mechanism which guides the weighing pan support in a parallel movement by means of two guide members which are parallel to each other and essentially horizontal, eccentric load errors occur primarily due to the fact that the parallel-guiding members deviate slightly from the ideal, absolutely parallel alignment. The relative magnitude of the eccentric load error, i.e. the ratio between the observed weighing error and the size of the test weight being used, approximately corresponds to the relative geometrical deviation which caused the eccentric load error. A distinction is made between an eccentric load error in the lengthwise direction and an eccentric load error in the transverse direction of the parallel-guiding mechanism, in accordance with the direction in which the test weight is moved on the weighing pan in an eccentric load test of the balance. An eccentric load error in the lengthwise direction occurs if the vertical distance between the parallel-guiding members at the end which is connected to the stationary parallelogram leg is not exactly equal to the distance at the opposite end which is connected to the movable parallelogram leg. An eccentric load error in the transverse direction, on the other hand, occurs if the two parallel-guiding members are slightly twisted relative to each other, i.e. if the distance between the parallel-guiding members varies over the width of the parallel-guiding members.

It is known that in weighing cells of the type disclosed for example in U.S. Pat. No. 6,232,567 B1, the parallelism deviations of the parallel guides and, consequently, the eccentric load errors associated with them can be corrected by removing material from the bending zones of the parallel guides by grinding or filing. A removal of material from the topside causes the effective center of rotation of the flexure pivot to be offset in the downward direction, while a removal of material from the underside of the bending zone will offset its effective center of rotation in the upward direction.

A further solution for the correction of eccentric load errors can be found, e.g., in WO 2005/031286, wherein by means of an adjusting device formed in the monolithic material block, the end of the upper parallel-guiding member which is connected to the stationary parallel leg can be raised or lowered as well as adjusted in regard to its transverse angle through adjustment screws, whereby the eccentric load errors in the lengthwise as well as the transverse direction of the weighing cell can be corrected.

A way to adjust eccentric load errors is also disclosed in JP 2002365125 A, wherein at two locations an adjustment zone with an adjustment flexure fulcrum is arranged between a flexure pivot and a parallel leg, and wherein each adjustment zone is connected to the first lever end of an adjustment lever and the adjustment flexure fulcrum serves at the same time as the fulcrum of the adjustment lever.

The adjustment of eccentric load errors by removing material from the flexure pivots presents a problem in weighing cells which are designed for precision balances and analytical balances, i.e. for small weighing loads and high resolutions, and which therefore have slender flexure pivots. The grinding or filing to remove material from a thin flexure pivot requires a sensitive touch. This operation is therefore in most cases performed manually and is accordingly cost-intensive.

Likewise, total freedom from problems is not achieved with the adjustment of eccentric load errors in the foregoing examples of WO 2005/031286 and JP 2002365125 A, wherein an adjustment device is formed on the stationary parallelogram leg by cuts and bored holes in the monolithic material block, and wherein by the tightening or loosening of adjustment screws the adjustment device can be deformed in such a way that the end of the upper parallel-guiding member that is connected to the adjustment device can be raised or lowered as well as twist-adjusted in its transverse angle. Even with the slightest corrective change, the adjustment device as disclosed in these references will cause considerable stresses in the material of the parallel-guiding mechanism. Over a longer time period, an age-related change can occur in the eccentric load adjustment as a result of stress relaxation in the material sectors which have been elastically biased in one direction or the other by means of the adjustment screws. Reversible short-term changes can be caused by temperature fluctuations, if the monolithic material block and the adjustment screws have different coefficients of thermal expansion.

A way to adjust eccentric load errors which is likewise based on elastic deformation is disclosed in DE 202 17 590 U1. By means of a screw exerting a pull on a lever-like projection, a bending moment is applied to a part which holds on one side a parallel-guiding member through a flexure pivot and carries on the opposite side the lever-like projection. Although the reduction ratio between the vertical movements of the free end of the projection and of the pivot location of the parallel-guiding member can be adapted to requirements through an appropriate choice of dimensions, it should be kept in mind that the part to which the bending moment is applied has to withstand the horizontal forces of the parallel-guiding member. It remains an essential drawback of this eccentric load adjustment that the adjustment range is very limited. Accordingly, the parallel-guiding mechanism needs to be manufactured with a commensurate level of precision so that the limited adjustment range will be sufficient to correct the remaining errors.

In commonly-owned U.S. Pat. No. 7,851,713, to one of the co-inventors here (Burkhard), a solution to these unsatisfactory aspects of the eccentric load adjustment in parallel-guiding mechanisms is proposed through the concept of providing an adjustment zone with an adjustment flexure fulcrum which is subjected to a controlled plastic deformation for the adjustment of parallelism. This eccentric load adjustment has proved itself exceptionally well in practice; the gravimetric measuring instruments equipped with it no longer have a temperature-dependent eccentric load error. Even those drift phenomena that manifest themselves over longer time periods could be reduced significantly, so that the intervals between calibrations could be extended.

The accuracy of the adjustment that can be achieved by plastically deforming the adjustment flexure fulcra is sufficient for gravimetric measuring instruments with a measurement resolution as fine as one milligram. In measuring instruments with a finer resolution, however, an adjustment of sufficient accuracy cannot be achieved because of changes in material properties that occur as a result of cold-forming.

A desired objective is to further develop the concept of the plastically deformable adjustment zone taught by Burkhard '713, the aim being to open the way to a more precise adjustment of the parallel-guiding mechanism while keeping the positive characteristics of the plastically deformable adjustment zone.

SUMMARY

This task is solved in a parallel-guiding mechanism with a movable parallel leg, a stationary parallel leg, a first parallel-guiding member and a second parallel-guiding member, wherein the parallel legs and the parallel-guiding members are connected to each other by flexure pivots in the form of narrow material connections. The movable parallel leg is constrained by the parallel-guiding members in a guided movement relative to the stationary parallel leg. Further, at least one adjustment zone with an adjustment flexure fulcrum is arranged between a flexure pivot and a parallel leg. In this arrangement it is irrelevant which of the flexure pivots is adjustable. The adjustment zone is connected to the first lever end of an adjustment lever, wherein the adjustment flexure fulcrum also forms the fulcrum of the adjustment lever.

According to the disclosed embodiments, the adjustment lever has an elastic sector whose section modulus is smaller than the section modulus of the adjustment flexure fulcrum, wherein the pivotal axis of the adjustment flexure fulcrum coincides with the lever fulcrum of the adjustment lever.

The section modulus is an established concept in the field of engineering mechanics to express the resistance that a body with a given cross-sectional profile offers against bending or torsion. In the case of forces whose line of action is perpendicular to a reference axis, the force acts in the sense of turning the body about the axis, if there is a lever for the force to act on. If the rotation is prevented by a mechanical constraint, this gives rise to a bending- or torsional moment. Consequently, section moduli are calculated in reference to the axes in which the moments and torques are acting.

The magnitude of the section modulus follows purely from the geometry of the cross-sectional profile and is obtained as the quotient of the area moment of inertia of a cross-sectional profile divided by the distance of the peripheral fiber from the neutral, stress-free fiber of the cross-section. The term "fiber" in this context means an imaginary line running parallel to the central longitudinal axis. Within the scope of the elementary bending beam theory, if the section modulus is known, the maximum bending stress occurring in the peripheral fiber as well as the bending stress over the entire profile area can be calculated.

Due to the fact that the section modulus of the elastic sector is smaller than the section modulus of the adjustment flexure fulcrum, the elastic sector determines the magnitude of the bending moment that a given deflection of the second, free end of the adjustment lever generates in the adjustment flexure fulcrum which defines the axis of rotation or fulcrum of the adjustment lever. The smaller the section modulus of the elastic sector, the smaller will be the bending moment that can be generated with a given lever movement. Or in other words, the smaller the section modulus of the elastic sector, the farther the second end of the lever has to be moved in order to generate a bending moment of a given magnitude in the adjustment flexure fulcrum. Through an appropriate choice of the dimensions that determine the section modulus, it is possible to achieve a highly sensitive "leverage effect" in converting a displacement of the second end of the adjustment lever into a bending moment in the adjustment flexure fulcrum. The bending moment in the adjustment flexure fulcrum causes an elastic deformation of the latter and thus a displacement of the flexure pivot that is located in the immediate vicinity of the adjustment flexure fulcrum.

Surprisingly, it was found that the advancement disclosed was neither accompanied by an increase of the temperature-dependent eccentric load errors nor by an increase of the long-term drift of the weighing signal. What could possibly explain this is that the influence that the internal material stresses have on temperature-dependent eccentric load errors and on drift phenomena decreases in exponential rather than linear proportion to the reduction of the stresses.

To adjust the eccentric load error in the longitudinal direction, it is sufficient to provide one adjustment zone. If an adjustment possibility is also required for the eccentric load error in the transverse direction, at least the adjustment zone and the adjustment flexure fulcrum can be divided into a first and a second adjustment zone with a first and a second adjustment flexure fulcrum adjacent to each other. The first adjustment zone includes a first adjustment lever, and the second adjustment zone includes a second adjustment lever, wherein the two levers can be adjusted independently of each other. As described above, this arrangement makes it possible to correct an existing twist error in the positions of the parallel-guiding members relative to each other.

To protect the flexure pivot in the immediate vicinity of the two adjustment zones against unintended deformations and harmful stresses, the flexure pivot can be divided into a first and second flexure pivot by a cut extending from the parallel-guiding member to the first and the second adjustment zone.

It should be noted at this point that the coarse adjustment of the disclosed parallel-guiding mechanism can be accomplished through a plastic deformation of the adjustment flexure fulcrum as disclosed in Burkhard '713, with the fine adjustment by means of the adjustment lever following only afterwards. To facilitate the operation of plastically deforming the adjustment flexure fulcrum, the at least one adjustment zone can include an engagement feature to provide a grip for an adjustment tool.

There are different ways to control the movement of the second end of the lever relative to the adjacent parallel leg. In a first embodiment, an adjustment-setting element such as an adjustment screw, an adjustment wedge or the like can be arranged between the parallel leg that is connected to the adjustment zone and the second end of the adjustment lever. The fine adjustment of the parallel-guiding mechanism is accomplished by means of the adjustment-setting element. In contrast to the state-of-the-art devices for the adjustment of the eccentric load error, no displacement or travel movement is transmitted by this fine adjustment. Rather, the result which is produced by a position adjustment of the second end of the adjustment lever and by means of the elastic sector is a bending moment which is exerted on the adjustment flexure fulcrum. The bending moment has the effect of causing a slight elastic deformation of the adjustment flexure fulcrum, whereby the position of the adjacent flexure pivot relative to the other flexure pivots is changed.

The adjustment-setting elements need to have the same coefficient of thermal expansion as the rest of the weighing cell; otherwise their length in relation to the weighing cell will change as a result of temperature fluctuations. It should also be taken into account that the screw connections are subject to certain aging mechanisms which can lead to an uncontrolled change in the behavior under an eccentric load.

Instead of the adjustment-setting element of the first embodiment, an adjustment-setting sector according to a second embodiment with a plastically deformable adjustment-setting flexure pivot can be formed on the parallel leg that is connected to the adjustment zone. The adjustment-setting sector is connected to the second end of the adjustment lever by means of a coupling element. Now, forcing a plastic deformation on the adjustment-setting flexure pivot will cause a displacement of the coupling element relative to the parallel leg and thus also a displacement of the second end of the lever. This second embodiment has the significant advantage that the eccentric load adjustment is not affected by temperature changes, as the adjustment-setting sector is formed out of the same material block as the rest of the weighing cell.

After the adjustment-setting flexure pivot has been plastically deformed, the elastic deformation of the elastic sector will continue to generate a permanent bending moment which is acting equally on the adjustment flexure fulcrum and the adjustment-setting flexure pivot. If the section moduli of the adjustment-setting flexure pivot and the adjustment flexure fulcrum are equal, their plastic and elastic deformation will require bending moments of equal magnitude. With the section moduli being equal, the bending stresses will likewise be equal in both places. Even as these bending stresses relax due to material creep, the set position will still be preserved, provided that the adjustment flexure fulcrum and the adjustment-setting flexure pivot are made of the same material.

The parallel-guiding mechanism can also be part of a force-transmitting system. In addition to the parallel-guiding mechanism, the force-transmitting system includes at least one force-transmitting lever which is pivotally supported on the stationary part and whose first lever arm is tied through a force-transmitting connection to the movable parallel leg. The second lever arm is connected, and thereby transmits forces, to a measurement transducer. Of course there can also be two or more levers arranged between the movable parallel leg and the measurement transducer for the transmission and leveraged reduction of the force.

Furthermore, the force-transmitting system can be machined out of one piece of material through the processes of drilling, milling, electrical discharge machining and the like, so that the parallel-guiding mechanism and the at least one force-transmitting lever are formed monolithically. As an alternative to the monolithic design, the force-transmitting system can also be assembled from a plurality of individual components.

For a complete weighing cell, a measurement transducer is added to the parallel-guiding mechanism or the force-transmitting system. If the weighing cell includes a force-transmitting system with a lever, the second lever arm of the at least one lever establishes the force-transmitting connection to the measurement transducer.

The weighing cell is part of a gravimetric measuring instrument, for example a balance, a dosage-dispensing apparatus, a titration apparatus, a mass comparator, a gravimetric moisture measurement instrument and the like.

The following method can be used to adjust the parallel-guiding mechanism or a gravimetric measuring instrument.

In a first step, the eccentric load error in the longitudinal direction and, if necessary the eccentric load error in the transverse direction are measured. Next, an adjusting tool is brought into engagement with the engagement feature of the at least one adjustment zone. By means of the adjusting tool a preliminary adjustment of the parallel-guiding mechanism is made through a plastic deformation of the at least one adjustment flexure fulcrum.

After the preliminary adjustment has been completed, the adjusting tool is removed and a fine adjustment of the parallel-guiding mechanism is made by means of the adjustment-setting element acting on the second end of the adjustment lever or by means of the adjustment-setting sector.

BRIEF DESCRIPTION OF THE DRAWINGS

Details of the disclosed parallel-guiding mechanism and of the method for its adjustment will be covered hereinafter in more detail, referring to the drawings according to the following overview, wherein identical parts are identified by identical reference numbers and wherein.

DETAILED DESCRIPTION

Figure 1:
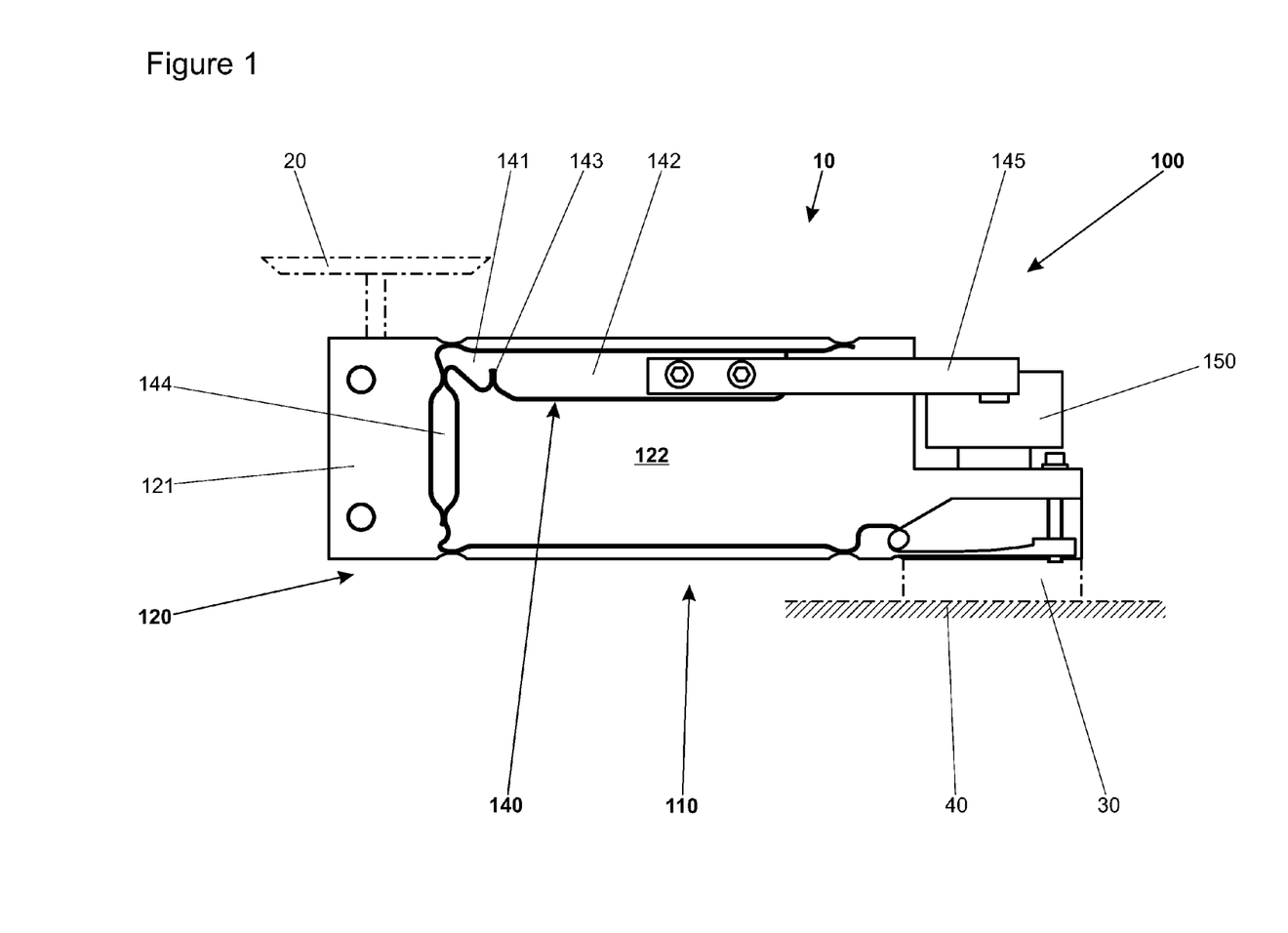
FIG. 1 is an elevation view showing a gravimetric measuring instrument with a weighing cell that includes a force-transmitting system.

FIG. 1 represents an elevation drawing of a weighing cell 100 with a force-transmitting system 110 which includes an embodiment of a parallel-guiding mechanism 120. The weighing cell 100 is part of a gravimetric measuring instrument 10 whose further parts are only partially indicated by dash-dotted lines, including the essential adjoining elements of the weighing cell 100. The first adjoining element is the load receiver 20 which is attached through a force-transmitting connection to a movable parallel leg 121 of the parallel-guiding mechanism 120. The second adjoining element is a support pad 30 which is fixed in a housing or chassis and which supports a stationary parallel leg 122 of the parallel-guiding mechanism 120 against the mechanical ground 40. A detailed description of the parallel-guiding mechanism 120, specifically the adjustment zone, will be given below in the context of FIGS. 2A to 2C.

The force-transmitting system 110 further includes a force-transmitting lever 140 which is pivotally supported on the stationary parallel leg 122 by means of the lever fulcrum 143. The first lever arm 141 of the force-transmitting lever 140 is connected to the movable parallel leg 121 for the transmission of forces by means of a coupling element 144. A lever arm extension 145 is solidly connected to the second lever arm 142 of the force-transmitting lever 140. At the opposite end from its connection to the second lever arm 142, the lever arm extension 145 is connected to the movable part of a measurement transducer 150. The movable part of the measurement transducer 150, which is not visibly represented in the drawing, is for example the magnetic coil of an EMFC transducer. The stationary part of the measurement transducer 150, which in the case of EMFC transducers is normally constituted by the permanent magnet, is solidly connected to the stationary parallel leg 122.

Figure 2A:
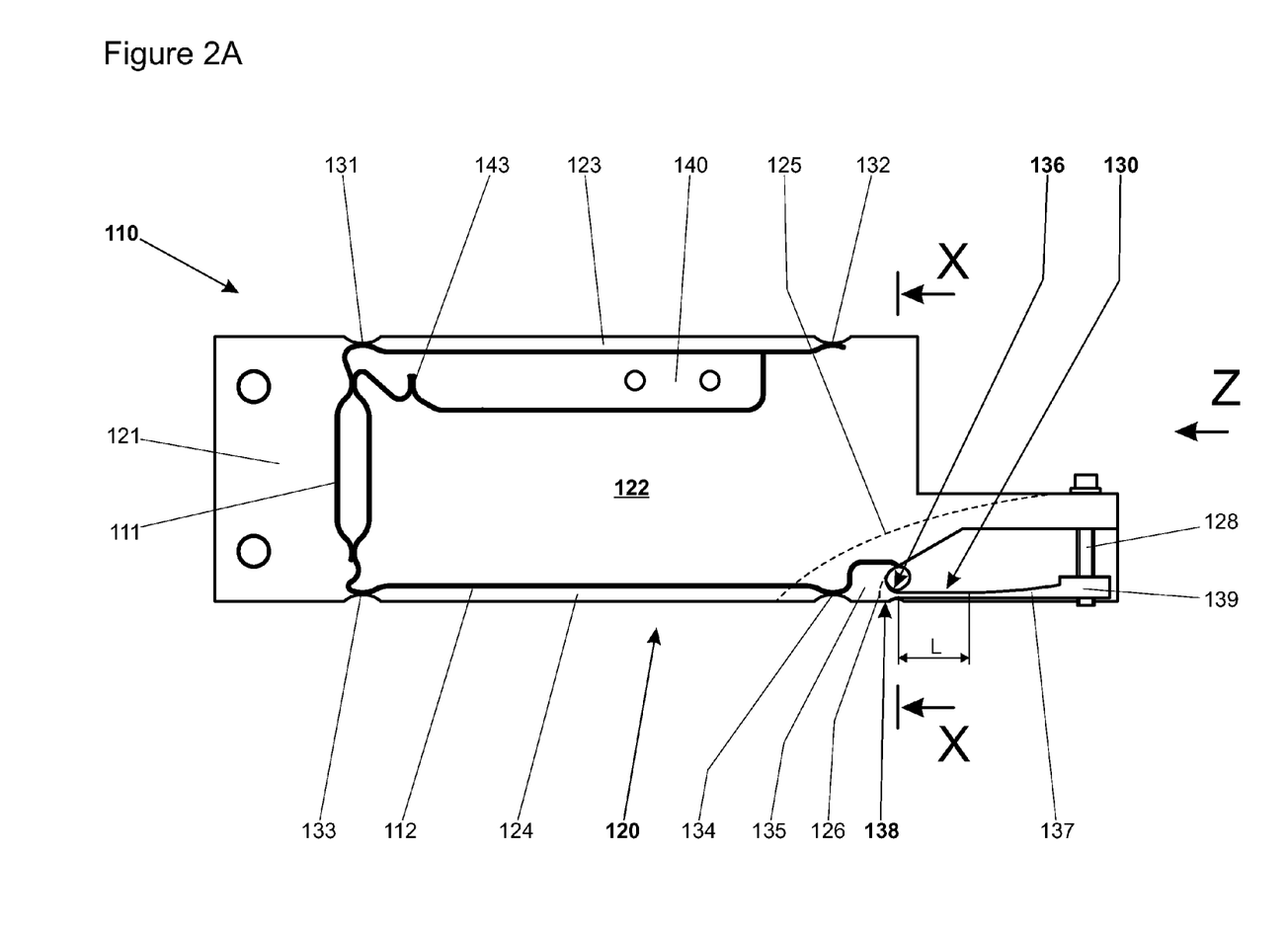
FIG. 2A shows, in elevation view, the force-transmitting system of the FIG. 1 weighing cell with a first embodiment of the parallel-guiding mechanism.

FIG. 2A represents an elevation drawing of a force-transmitting device 110 with a first embodiment of the parallel-guiding mechanism 120. As this force-transmitting device is exactly analogous to the force-transmitting device 110 of FIG. 1, the same reference symbols are used. With no attached components represented in FIG. 2A, the design concept and function of the force-transmitting system 110 present themselves more clearly. The force-transmitting system 110 is made of a single block of material, wherein the individual components are formed by material-removing operations such as sawing, milling, drilling, electrical discharge machining and the like. By means of two separating cuts 111, 112, the force-transmitting lever 140, its lever fulcrum 143, the movable parallel leg 121, a first parallel-guiding member 123, a second parallel-guiding member 124, four flexure pivots 131, 132, 133, 134 and an adjustment zone 135 are almost completely separated from the stationary parallel leg 122. The separation is not entirely complete because the first flexure pivot 131 monolithically connects the movable parallel leg 121 to the first parallel-guiding member 123 and the second flexure pivot 132 monolithically connects the first parallel-guiding member 123 to the stationary parallel leg 122. The movable parallel leg 121 is further connected by way of the third flexure pivot 133 to the second parallel-guiding member 124, and the latter is connected by the fourth flexure pivot 134 to the adjustment zone 135. The adjustment zone 135 is connected by an adjustment flexure fulcrum 136 to the stationary parallel leg 122 and is only partially visible because an adjustment lever 137 is arranged in front of the adjustment flexure fulcrum 136. The adjustment flexure fulcrum 136 is divided into a first and a second adjustment flexure fulcrum 136A, 136B, as can be seen more clearly in FIG. 2B which shows the force-transmitting system 110 in cross-section in the sectional plane X-X.

Figure 2B:
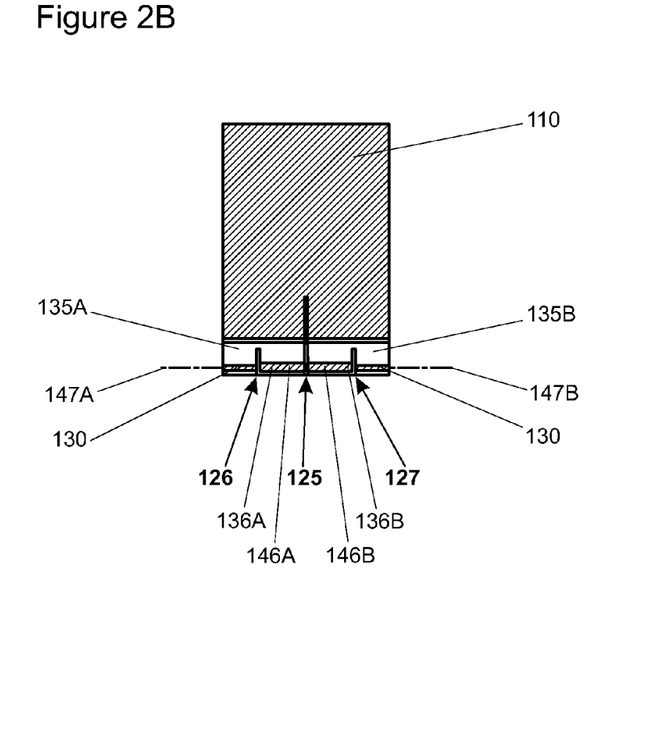
FIG. 2B shows a cross-section of the force-transmitting system, taken along plane X-X of FIG. 2A.
Figure 2C:
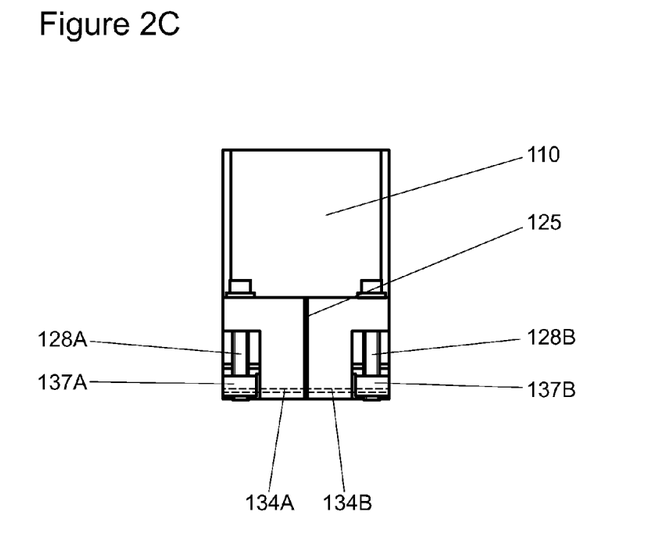
FIG. 2C is a side view of the FIG. 2A force-transmitting system in the viewing direction of the arrow Z.

The force-transmitting system 110 is sliced partway, parallel to the drawing plane of FIG. 2A, by three cuts. One of the cuts, which will be referred to as the midway cut 125, cuts along a center plane through the adjustment flexure fulcrum 136, the adjustment zone 135 and the fourth flexure pivot 134. This midway cut, which is more clearly evident in FIGS. 2B and 2C, subdivides the aforementioned elements into a first adjustment flexure fulcrum 136A, a first adjustment zone 135A and a first flexure pivot 134A as well as a second adjustment flexure fulcrum 136B, a second adjustment zone 135B and a second flexure pivot 134B for the purpose of allowing the eccentric load error to be adjusted and corrected also in the transverse direction of the parallel-guiding mechanism 120. In FIG. 2A, the end of the midway cut 125 is represented by a broken line. In FIGS. 2B and 2C, the midway cut 125 appears as a deep incision in the center. The two other cuts are the lever-delimiting cuts 126, 127 which separate the adjustment levers 137A, 137B that are located on both outside flanks from the stationary parallel leg 122. Due to this separation by means of the lever-delimiting cuts 126, 127 the first adjustment flexure fulcrum 136A simultaneously takes on the function of the first lever fulcrum 146A of the first adjustment lever 137A and the second adjustment flexure fulcrum 136B simultaneously takes on the function of the second lever fulcrum 146B of the second adjustment lever 137B. Each adjustment zone pivots about the respective axis of rotation of its adjustment fulcrum 147A, 147B.

The two adjustment levers 137A, 137B are configured identically. Their design is evident with particular clarity from FIG. 2A. The first end 138 of the adjustment lever 137 is solidly connected to the adjustment zone 135. The second end 139 of the adjustment lever 137 is freely movable. The movement of the second end 139 is parallel to the drawing plane of FIG. 2A and is controlled by an adjustment-setting element in the form of an adjustment screw 128 which is arranged between the stationary parallel leg 122 and the second end 139 of the adjustment lever 137. The adjustment lever 137 has an elastic sector 130 which extends over a length L and behaves like a leaf spring. A displacement of the second end 139 causes a bending deformation of the elastic sector 130 and generates a bending moment which acts on the adjustment flexure fulcrum 136 and is taken up by the latter. Due to the bending moment at the moment axis 147, the adjustment flexure fulcrum 136 is elastically deformed and the adjustment zone 135 is subjected to a rotary displacement which depends on the magnitude of the bending moment and whose center of rotation lies in the adjustment flexure fulcrum 136 with the moment axis 147. Since the fourth flexure pivot 134 is arranged at a distance from the adjustment flexure fulcrum 136, the fourth flexure pivot 134 changes its position relative to the stationary parallel leg 122 and to the other flexure pivots 131, 132, 133, with the extent of the position change depending on the angular displacement of the adjustment flexure fulcrum 136. As its end result, this position change produces the desired adjustment of the eccentric load error.

As is evident from FIG. 2B, the cross-sectional profile area and the section modulus of the elastic sector 130 are significantly smaller than the cross-sectional profile area and the section modulus of the adjustment flexure fulcrum 136. This applies to the first adjustment flexure fulcrum 136A as well as to the second adjustment flexure fulcrum 136B.

FIG. 2C, wherein the force-transmitting system of FIG. 2A is shown from the side as seen in the direction of the arrow Z, illustrates that there is a first adjustment screw 128A and a second adjustment screw 128B. Following the coarse adjustment of the parallel-guiding mechanism 120 in the lengthwise and transverse directions by means of a plastic deformation of the first and the second adjustment flexure fulcrum 136A, 136B, the parallel-guiding mechanism 120 is fine-adjusted by means of the first and second adjustment screws 128A, 128B. Since larger deviation of the flexure pivots 131, 132, 133, 134 in their positions relative to each other have already been corrected through the plastic deformation of the adjustment flexure fulcra 136A, 136B, the material stresses caused by the fine adjustment will be very small and hardly lead to any drift symptoms in the weighing signal. Temperature-related changes in the lengths of the adjustment screws, likewise, are transmitted by the elastic sectors with such a strong reduction ratio, that they have no influence on the eccentric load errors.

Figure 3A:
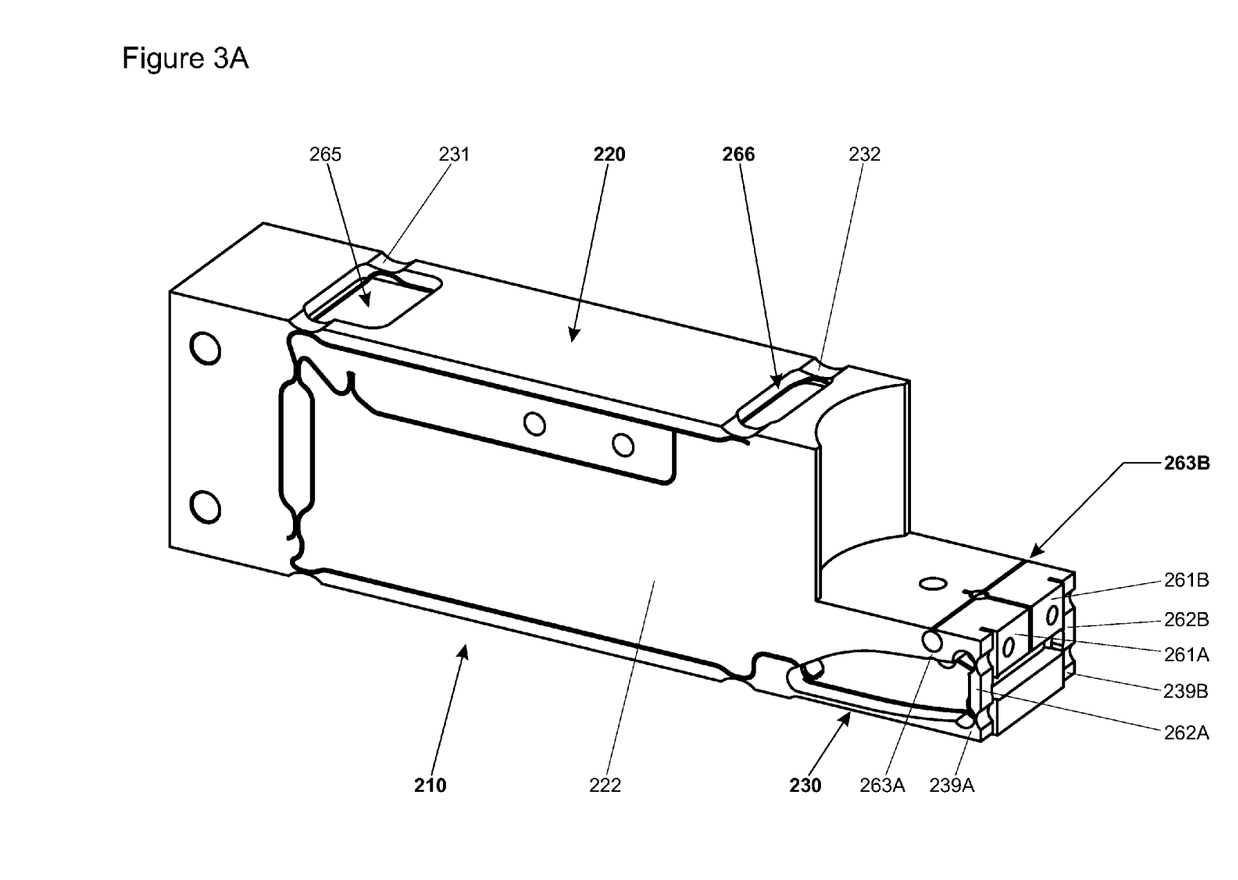
FIG. 3A is a perspective view directed at the top and the side of a force-transmitting system with a second embodiment of the parallel-guiding mechanism.
Figure 3B:
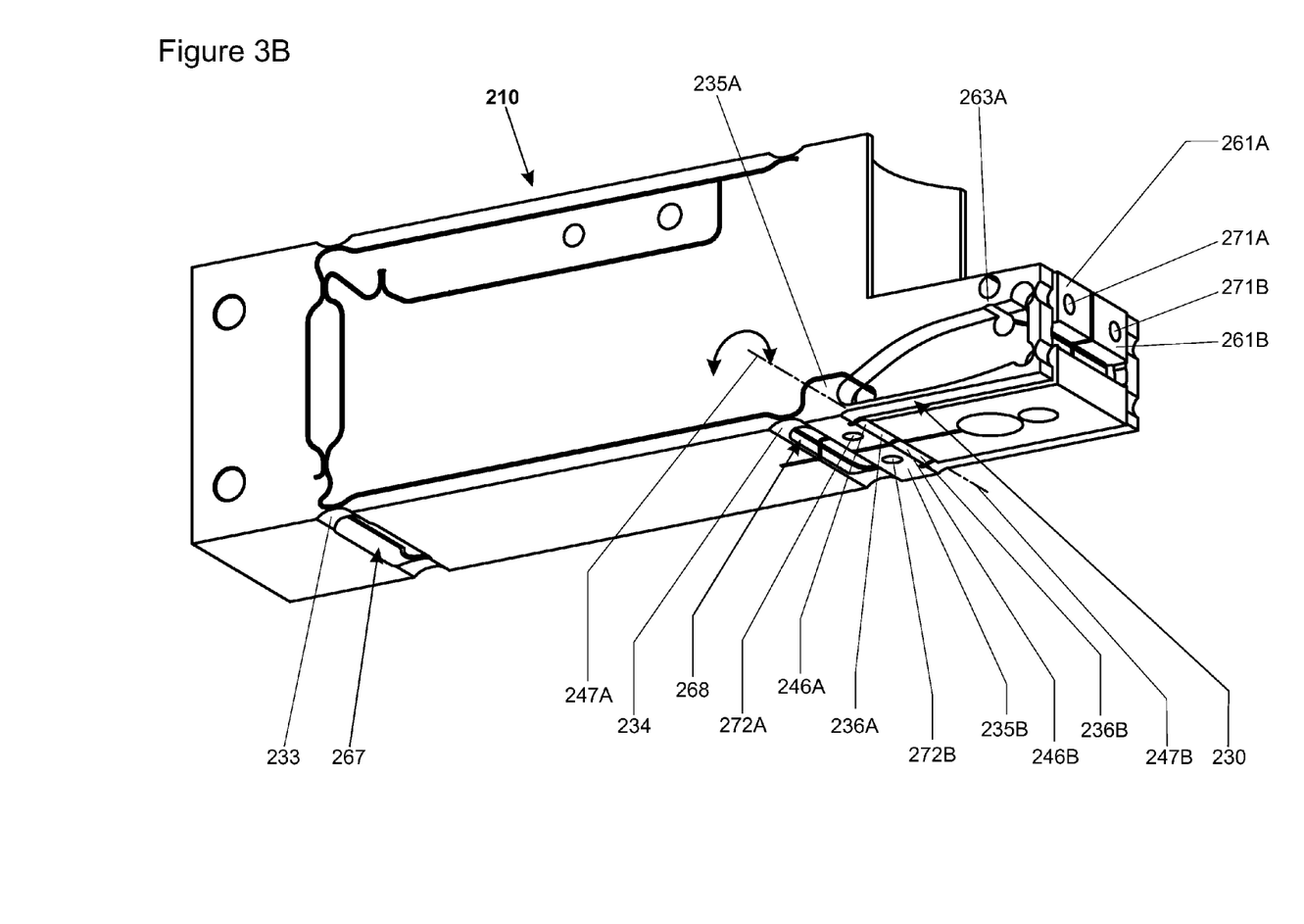
FIG. 3B shows a perspective view directed at the bottom and the side of the FIG. 3A force-transmitting system.
Figure 3C:
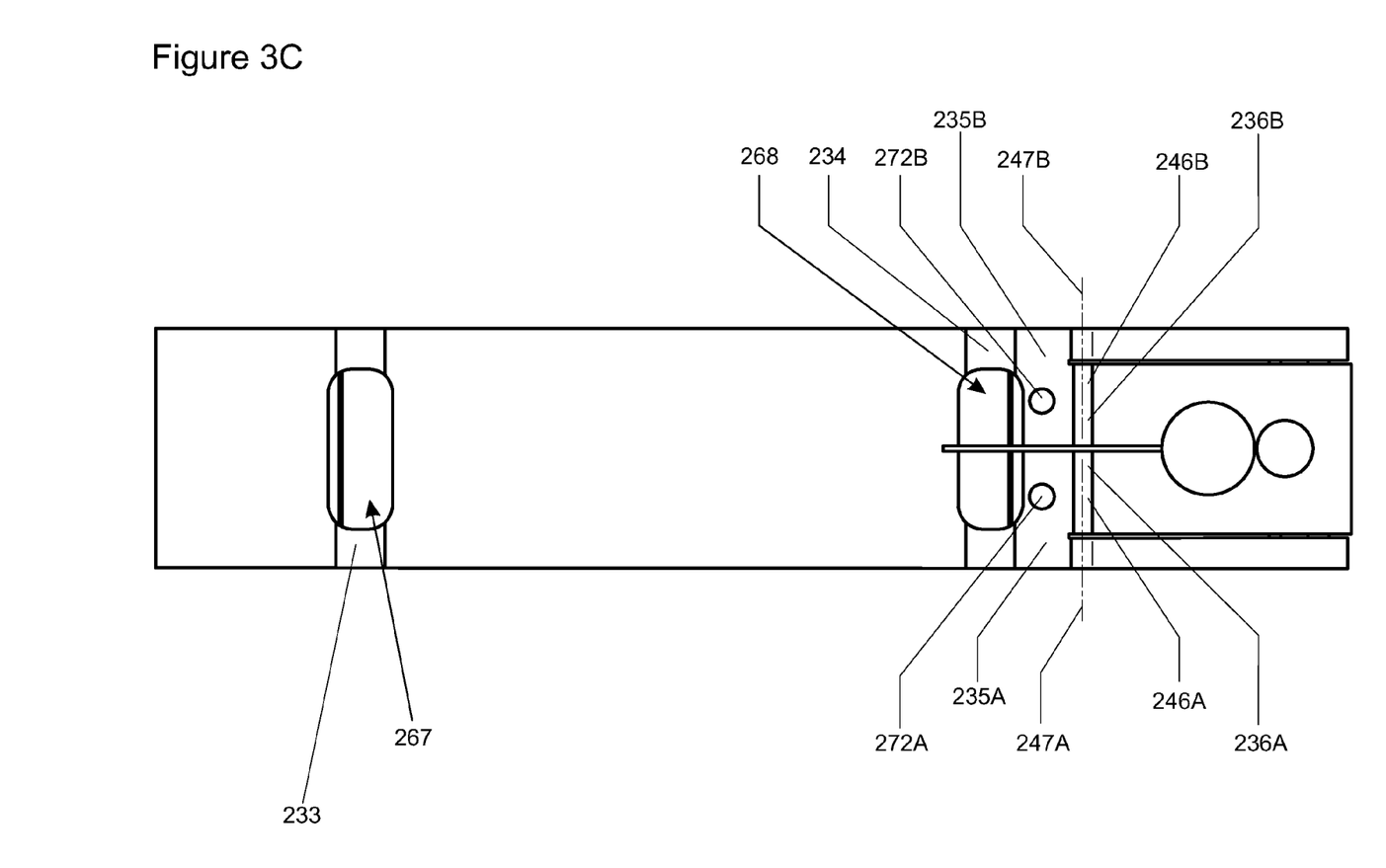
FIG. 3C shows a direct view at the underside of the FIG. 3A force-transmitting system.

FIG. 3A shows a perspective view directed at the top and the side of a force-transmitting system 210 with a second embodiment of a parallel-guiding mechanism 220. FIG. 3B shows a perspective view directed at the underside, and FIG. 3C shows a direct view at the underside of the force-transmitting system 210 of FIG. 3A. In the following, all three of the FIGS. 3A, 3B and 3C are described together.

The second embodiment is distinguished from the first embodiment only by the adjustment-setting sectors 261A, 261B and adjustment coupling elements 262A, 262B taking the place of the adjustment-setting elements of the first embodiment of FIGS. 1 and 2A to 2C. Furthermore, the large cutouts 265, 266 which can be seen in the vicinity of the first and second flexure pivots 231, 232 have the purpose of minimizing the restoring forces generated by the elastic deformation of the flexure pivots 231, 232.

The adjustment-setting sectors 261A, 261B and the adjustment coupling elements 262A, 262B are adjustment-setting elements which are delimited against the stationary parallel leg 222 through material-removing operations. Each of the adjustment-setting sectors 261A, 261B is connected to the stationary parallel leg 222 through an adjustment-setting flexure pivot 263A, 263B. Plastically deforming the adjustment-setting flexures 263A, 263B causes a permanent angular displacement of the adjustment-setting sectors 261A, 261B which, in turn, causes a permanent displacement of the adjustment coupling elements 262A, 262B relative to the stationary parallel leg 222. The displacement of the adjustment coupling elements 262A, 262B is transmitted to the lever ends 239A, 239B and, analogous to the adjustment with an adjustment screw, produces a bending moment whose magnitude depends on the elastic sector 230 and on the displacement and which acts on the adjustment flexure fulcra 236A, 236B that are shown in FIG. 3B. Thus, the adjustment flexure fulcra 236A, 236B simultaneously constitute the lever fulcra of the adjustment levers 246A, 246B, since the applied bending moments and the adjustment flexure fulcra 236A, 236B have the same axis of rotation, i.e. the moment axis 247A, 247B.

As FIG. 3B further illustrates, there are large cutouts 267, 268 arranged in the areas of the third and fourth flexure pivots 233, 234, which have again the purpose of minimizing the restoring forces resulting from an angular displacement of the flexure pivots 233, 234. To produce the plastic deformations in the adjustment flexure fulcra 236A, 236B and in the adjustment-setting flexure pivots 263A, 263B, it has to be possible to apply bending moments at the moment axis 247A, 247B which exceed the elastic limit of the material in the respective flexures. Each of the adjustment zones 235A, 235B and the adjustment-setting sectors 261A, 261B therefore has an engagement feature to provide a grip for an adjustment tool. As shown here, an engagement feature can take the form of a cylindrical hole, as shown in FIG. 3B as 271A, 271B, 272A and 272B.

Although the invention has been described through the presentation of specific examples of embodiments, it will be evident to the reader that numerous further variant embodiments could be developed from the teachings of the present invention, for example by combining the features of the individual examples with each other and/or by interchanging individual functional units between the embodiments described herein. As an example, the adjustment zone according to the invention could also be arranged on the movable parallel leg instead of on the stationary parallel leg. Furthermore, the configuration of the adjustment zone according to the invention could also be used in encapsulated weighing cells of the kind disclosed, e.g. in EP 2 120 023 A1. Of course, the parallel-guiding mechanism or parts of the force-transmitting system could also be assembled of different components and still be equipped with the eccentric load error adjustment of the present invention. Accordingly any such combinations and variant embodiments are considered to be part of the present invention.

What is claimed is:

1. A parallel-guiding mechanism, comprising:
   a movable parallel leg;
   a stationary parallel leg;
   a first and a second parallel-guiding member, the parallel-guiding members constraining the movable parallel leg in guided movement relative to the stationary parallel leg;
   flexure pivots that connect the parallel legs and the parallel-guiding members to each other, the flexure pivots being in the form of narrow material connections;
   at least one adjustment zone, each of which has:
      a corresponding adjustment flexure fulcrum, arranged between one of the flexure pivots and one of the parallel legs and
      an engagement feature providing a grip for an adjustment tool to plastically deform the corresponding adjustment flexure fulcrum; and
   an adjustment lever corresponding to, and connected to, each of the adjustment zones, each adjustment lever having a first lever end with the corresponding adjustment zone and an adjustment lever fulcrum arranged at the first lever end,
   a lever delimiting cut that separates the adjustment lever from the stationary parallel leg, wherein, due to the delimiting cut, the adjustment flexure fulcrum also operates as the fulcrum of the adjustment lever, and wherein the fulcra have a common axis of rotation, such that an elastic sector of the adjustment lever has a section modulus which is smaller than the section modulus of the corresponding adjustment flexure fulcrum.

2. The mechanism of claim 1, wherein:

at least one of the at least one adjustment zones is divided into a pair of adjacent adjustment zone parts, each of the adjacent adjustment zone parts having a corresponding adjustment flexure fulcrum, each of the adjacent adjustment zone parts defining an adjustment lever.

3. The mechanism of claim 2, wherein:

each of the flexure pivots is split into a pair of flexure pivots, each of which connects the parallel guiding member with which it is associated to one of the pair of adjacent adjustment zone parts.

4. The mechanism of claim 3, further comprising:

an adjustment-setting element, arranged between the parallel leg that is connected to the adjustment zone and the second lever end of the adjustment lever.

5. The mechanism of claim 3, further comprising:

an adjustment-setting sector, having a plastically deformable adjustment-setting flexure pivot, formed on the parallel leg that is connected to the adjustment zone; and a coupling element that connects the adjustment-setting sector to the second end of the adjustment lever.

6. The mechanism of claim 5, wherein:

the section moduli of the adjustment-setting flexure pivot and of the adjustment flexure fulcrum are of equal magnitude.

7. A force-transmitting system, comprising:

a parallel-guiding mechanism of claim 1; and at least one force-transmitting lever having a first lever arm that is tied to the movable parallel leg, providing a force-transmitting connection.

8. The force-transmitting system of claim 7, wherein:

the parallel-guiding mechanism and the at least one force-transmitting lever are monolithically formed out of one piece.

9. A weighing cell, comprising:

a force-transmitting system of claim 8; and a measurement transducer having a force-transmitting connection to a second lever arm of the at least one force-transmitting lever.

10. A gravimetric measuring instrument, comprising:

a weighing cell of claim 9.

11. The mechanism of claim 1, further comprising:

an adjustment-setting element, arranged between the parallel leg that is connected to the adjustment zone and the second lever end of the adjustment lever.

12. The mechanism of claim 1, further comprising:

an adjustment-setting sector, having a plastically deformable adjustment-setting flexure pivot, formed on the parallel leg that is connected to the adjustment zone; and a coupling element that connects the adjustment-setting sector to the second end of the adjustment lever.

13. A method for adjusting a parallel-guiding mechanism according to claim 1, the method comprising the steps of:

measuring eccentric load errors in the lengthwise and transverse directions;

inserting an adjustment tool in the engagement feature of the at least one adjustment zone;

plastically deforming the adjustment flexure fulcrum with the adjustment tool, resulting in pre-adjustment of the parallel-guiding mechanism;

removing the adjustment tool; and acting on the second lever end of the adjustment lever to fine-adjust the parallel-guiding mechanism, by means of at least one of:

an adjustment-setting element that is arranged between the parallel leg that is connected to the adjustment zone and the second lever end of the adjustment lever; and an adjustment-setting sector, having a plastically-deformable adjustment-setting flexure pivot, the adjustment-setting sector formed on the parallel leg that is connected to the adjustment zone, wherein a coupling element connects the adjustment setting sector to the second end of the adjustment lever.

14. The method of claim 13, wherein:

the parallel-guiding mechanism is part of a gravimetric measuring instrument.

* * * * *